United States Patent
Ward et al.

(10) Patent No.: US 12,129,743 B2
(45) Date of Patent: Oct. 29, 2024

(54) DOWNHOLE POWER GENERATION DEVICES AND METHOD FOR GENERATING POWER DOWNHOLE

(71) Applicant: Expro North Sea Limited, Aberdeen (GB)

(72) Inventors: Stuart Ward, Bournemouth (GB); Julian Richard Trinder, Southampton (GB)

(73) Assignee: Expro North Sea Limited, Dyce (GB)

( * ) Notice: Subject to any disclaimer, the term of this patent is extended or adjusted under 35 U.S.C. 154(b) by 138 days.

(21) Appl. No.: 17/780,828

(22) PCT Filed: Nov. 27, 2020

(86) PCT No.: PCT/EP2020/083636
§ 371 (c)(1),
(2) Date: May 27, 2022

(87) PCT Pub. No.: WO2021/105366
PCT Pub. Date: Jun. 3, 2021

(65) Prior Publication Data
US 2023/0028913 A1    Jan. 26, 2023

(30) Foreign Application Priority Data
Nov. 28, 2019 (GB) .................................. 1917357

(51) Int. Cl.
*E21B 41/00* (2006.01)
*H02N 11/00* (2006.01)

(52) U.S. Cl.
CPC ....... *E21B 41/0085* (2013.01); *H02N 11/002* (2013.01)

(58) Field of Classification Search
CPC .................................................. E21B 41/0085
See application file for complete search history.

(56) References Cited

U.S. PATENT DOCUMENTS

| | | | | |
|---|---|---|---|---|
| 9,018,786 B2* | 4/2015 | Hama | ..................... | F03B 17/06 |
| | | | | 290/43 |
| 2003/0131986 A1* | 7/2003 | Schultz | ................ | H02K 7/1823 |
| | | | | 166/66.5 |
| 2005/0230974 A1 | 10/2005 | Masters | | |
| 2006/0086498 A1* | 4/2006 | Wetzel | .................... | E21B 47/00 |
| | | | | 166/250.12 |
| 2008/0277941 A1 | 11/2008 | Bowles | | |
| 2011/0049901 A1 | 3/2011 | Tinnen | | |
| 2011/0140458 A1* | 6/2011 | Arnold | ................... | H02K 35/04 |
| | | | | 290/1 R |

(Continued)

*Primary Examiner* — Blake Michener
(74) *Attorney, Agent, or Firm* — Getz Balich LLC

(57) ABSTRACT

A downhole electrical power generation device is provided that includes at least one magnetic element, an electrically conductive element, and a member configured to be positioned within downhole fluid and to vibrate when the downhole fluid flows across a surface of the member. One of the magnetic element and the electrically conductive element is positioned on the member, and the other is configured to be positioned such that the electrically conductive element is located in a magnetic field produced by the at least one magnetic element to generate electrical power on vibration of the member. A method of generating electrical power downhole is further provided.

18 Claims, 5 Drawing Sheets

(56) References Cited

U.S. PATENT DOCUMENTS

| | | |
|---|---|---|
| 2012/0228875 A1 | 9/2012 | Hardin, Jr. |
| 2012/0319409 A1* | 12/2012 | Schoonover ............ F03B 13/02 |
| | | 290/1 R |
| 2013/0192682 A1* | 8/2013 | Freese ................. E21B 43/2401 |
| | | 137/13 |
| 2016/0102529 A1 | 4/2016 | Disantis |
| 2016/0168957 A1 | 6/2016 | Tubel |
| 2017/0306725 A1* | 10/2017 | Hunter ................ E21B 41/0085 |
| 2018/0266240 A1* | 9/2018 | Jaaskelainen ........... E21B 49/08 |
| 2018/0351480 A1 | 12/2018 | Ahmad |

* cited by examiner

DOWNHOLE POWER GENERATION DEVICES AND METHOD FOR GENERATING POWER DOWNHOLE

This application claims priority to PCT Patent Appln. No. PCT/EP2020/083636 filed Nov. 27, 2020, which claims priority GB Patent Appln. No. 1917357.4 filed Nov. 28, 2019, which are herein incorporated by reference.

BACKGROUND OF THE INVENTION

1. Technical Field

The subject application generally relates to power generation and, and in particular, to downhole power generation devices and method of generating power downhole.

2. Background Information

Electrical power is generally provided to downhole tools in the oil and gas industry via power cables or batteries. Power cables may take the form of tubing encapsulated cables (TEC) that simultaneously provide power downhole and transmit data. Providing power via cables is often challenging with cost, set up time and cable corrosion being particularly challenging issues. Furthermore, in certain applications, such as abandonment, reliable topside power sources may not be readily available.

Batteries may instead or additionally be used to provide power to downhole tools in the oil and gas industry. However, battery size and battery life as well as the operating environment are particularly challenging issues for battery technology. Power demands for data collection, and transmission and reception of signals may be relatively high compared to the power available from batteries given size constraints on the batteries used. Furthermore, the types of batteries which may be used and the expense of these batteries are influenced by the environment in which the batteries must survive and operate. In case of some offshore or remote installations, particularly downhole, the replacement of used batteries may be difficult, impossible or not cost effective. When the batteries powering a tool have run down, the tool may have to be replaced.

There is a need for robust and reliable downhole electrical power generation and energy storage technologies in order to push the boundaries of downhole sensing and control. Downhole power generation is an enabling technology for a wide range of future production systems and applications including self-powered downhole monitoring, downhole robotics, and wireless intelligent completions. Furthermore, downhole electrical power generation may enable the required downhole monitoring of abandoned wells in mature oilfields.

This background serves only to set a scene to allow a person skilled in the art to better appreciate the following description. Therefore, none of the above discussion should necessarily be taken as an acknowledgement that that discussion is part of the state of the art or is common general knowledge. One or more aspects/embodiments of the invention may or may not address one or more of the background issues.

SUMMARY OF THE INVENTION

In one example, there is provided a downhole electrical power generation device. The device is more resilient and more robust than existing downhole power generation devices. Furthermore, the device does not significantly restrict downhole fluid flow.

In some or more examples, the downhole power generation device comprises: at least one magnetic element; an electrically conductive element; and a member configured to be positioned within downhole fluid and vibrate when the downhole fluid flows across a surface of the member. One of the at least one magnetic element and the electrically conductive element is positioned on the member. The other of the at least one magnetic element and the electrically conductive element is configured to be positioned such that the electrically conductive element is located in a magnetic field produced by the at least one magnetic element to generate electrical power on vibration of the member.

Conventional downhole power generation devices use turbines or oscillating pistons. However, such devices may cause blockages in downhole tubing, affect fluid flow and expose moving surfaces, e.g. bearings and seals, to downhole fluid which may cause corrosion, wear and failure.

In contrast, in the described downhole power generation device only one of the member, not the electrically conductive element, is exposed to downhole fluid and does not significantly impair fluid flow. Furthermore, the magnetic field does not affect the downhole fluid.

Vibration of the magnetic element causes a change in the magnetic coupling field. The electrically conductive element which is positioned within the magnetic field generated by the magnetic element is exposed to changing magnetic flux. The changing magnetic flux generates an electromotive force in the electrically conductive element via Faraday's law of induction.

In some or more examples, the magnetic element comprises an array of magnets.

In some or more examples, at least two adjacent magnets of the array are rotated with respect to each other.

In some or more examples, the array of magnets forms a Halbach array.

In some or more examples, the array of magnets is configured to augment the magnetic field such that a magnitude of the magnetic field on a first side of the array is greater than a magnitude of the magnetic field on a second, substantially opposed side of the array.

In some or more examples, the magnetic field on the second side of the array is suppressed.

In some or more examples, the Halbach array is a linear array of adjacent permanent magnets. In some or more examples, the Halbach array is a two-dimensional array of permanent magnets. In some or more examples, the Halbach array has a planar configuration of radially-aligned and axially-aligned permanent magnets in circular format, such that the magnetic field is axially concentrated on one side of the array and suppressed on the opposite side.

In some or more examples, the one of the at least one magnetic element and the electrically conductive element is positioned at or proximal to a distal end of the member.

In some or more examples, the one of the at least one magnetic element and the electrically conductive element is embedded and/or encased within the member. Having the magnetic element or the electrically conductive element embedded in the member ensures that that magnetic element or the electrically conductive element, respectively, is not exposed to downhole fluid and therefore not damaged or corroded by the downhole fluid.

In some or more examples, the member is mounted on a flexible cantilever structure. The cantilevered member is configured to vibrate or flutter when exposed to fluid flow.

In some or more examples, the member is cantilevered and configured to project into the downhole fluid.

In some or more examples, the member has a stiffness permitting bending of the member under a force resulting from turbulence in the downhole fluid flowing past the member.

In some or more examples, the member is shaped to increase and/or generate the force in a particular direction. The increased force results in increased vibration that generates a greater electromotive force in the electrically conductive member.

In some or more examples, the electrically conductive element comprises a coil of electrically conductive wire and is configured to optimize magnetic coupling.

In some or more examples, the electrically conductive wire is configured to be positioned such that a longitudinal axis of the at least part of the wire is transverse to the magnetic field. In this orientation, electromotive force in the electrically conductive element is maximized.

In some or more examples, the member is made of a corrosion-resistant material. This ensures that the member does not corrode and/or fail upon exposure to fluid. This results in a longer lasting downhole power generation device that may be used in long term applications such as abandonment.

In a further example, a downhole tool is provided. The downhole tool comprises the described downhole power generation device.

In some or more examples, the member protrudes from the downhole tool. Specifically, the member protrudes into fluid. In some or more examples, the fluid is production fluid.

In some or more examples, the member is made of the same material as a housing of the downhole tool. In some or more examples, the housing of the downhole tool is corrosion-resistant. The member is therefore similarly corrosion-resistant.

In some or more examples, the other of the at least one magnetic element and the electrically conductive element is positioned within the downhole tool. The at least one magnetic element or the electrically conductive element is therefore protected from the downhole fluid within the downhole tool.

In some or more examples, the downhole tool includes gauges and sensors to collect information such as temperature, pressure, strain, stress, force, resistivity, conductivity and pH. In some or more examples, the downhole tool includes one or more batteries to power the downhole tool. In some or more examples, the downhole tool includes a communication module to at least one of transmit and receive information from a remote location. In one or more examples, the remote location is a surface location.

In some or more examples, the generated power powers one or more components of the downhole tool and/or charges a battery of the downhole tool. In some or more examples, the electrically conductive element is connected to a load within the downhole tool to power the downhole tool. In some or more examples, the electrically conductive element is connected to one or more batteries of the downhole tool to charge the batteries. In some or more examples, the electrically conductive element is connected to one or more batteries via a suitable regulator.

By having a downhole power generation device providing electrical power to the downhole tool, the downhole tool may have fewer, if any batteries, and therefore the useful life of the downhole tool may be extended beyond the useful life of the batteries. Furthermore, the space taken by the batteries may instead be used for additional sensing or communication equipment.

In some or more examples, the member protrudes from downhole tubing, and the other of the at least one magnetic element and the electrically conductive element is positioned within or on an exterior side of the downhole tubing.

In some or more examples, the downhole tubing forms part of a well. In some or more examples, the well is an onshore or offshore well. In some or more examples, the well is an appraisal well or a production well.

In some or more examples, the downhole fluid is production fluid.

In another example, there is provided a method of generating electrical power downhole. The method is more resilient and/or robust than existing downhole power generation methods. Furthermore, the method does not significantly restrict downhole fluid flow.

In some or more examples, the method comprises positioning one of at least one magnetic element and an electrically conductive element on a member of a downhole power generation device; positioning the other of the at least one magnetic element and the electrically conductive element such that the electrically conductive element is located in a magnetic field produced by the at least one magnetic element; positioning the member in a flow of downhole fluid the member vibrating when the downhole fluid flows across a surface of the member; and generating electrical power in the electrically conductive element on vibration of the member in fluid flow.

As previously stated, conventional downhole power generation devices use turbines or oscillating pistons which may cause blockages in downhole tubing, affect fluid flow and expose moving surfaces, e.g. bearings and seals, to downhole fluid causing corrosion, wear and failure.

In the described method, only the member is exposed to downhole fluid flow, thus fluid flow is not significantly affected. Furthermore, in some or more examples, the member is made of corrosion-resistant material to ensure the member does not fail or corrode.

Vibration of the member due to exposure to fluid flow generates power in the electrically conductive element. Specifically, the at least one magnetic element induces an electromotive force in the electrically conductive element via Faraday's law of magnetic induction. There are few moving parts therefore the recited method may robustly produce power for a significantly longer period of time than conventional downhole power generation methods.

In some or more examples, the electrically conductive element takes the form of any of the described electrically conductive elements.

In some or more examples, the method further comprises powering one or more components of a downhole tool and/or charging a battery of the downhole tool with the generated electrical power.

By providing power to the downhole tool, the downhole tool may have fewer, if any batteries, and therefore the useful life of the downhole tool may be extended beyond the useful life of the batteries. Furthermore, the space taken by the batteries may instead be used for additional sensing or communication equipment.

Aspects of the inventions described may include one or more examples, embodiments or features in isolation or in various combinations whether or not specifically stated (including claimed) in that combination or in isolation.

BRIEF DESCRIPTION OF THE DRAWINGS

A description is now given, by way of example only, with reference to the accompanying drawings, in which.

DETAILED DESCRIPTION OF THE INVENTION

Figure 1:
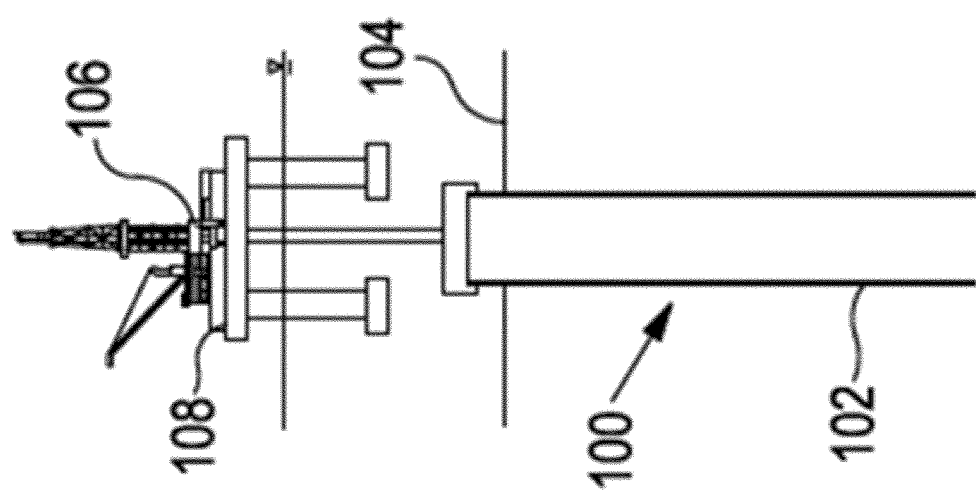
FIG. 1 is a simplified representation of a well structure.

The foregoing summary, as well as the following detailed description of certain embodiments will be better understood when read in conjunction with the accompanying drawings. As will be appreciated, like reference characters are used to refer to like elements throughout the description and drawings. As used herein, an element or feature recited in the singular and preceded by the word "a" or "an" should be understood as not necessarily excluding a plural of the elements or features. Further, references to "one example" or "one embodiment" are not intended to be interpreted as excluding the existence of additional examples or embodiments that also incorporate the recited elements or features of that one example or one embodiment. Moreover, unless explicitly stated to the contrary, examples or embodiments "comprising", "having" or "including" an element or feature or a plurality of elements or features having a particular property might further include additional elements or features not having that particular property. Also, it will be appreciated that the terms "comprises", "has" and "includes" mean "including but not limited to" and the terms "comprising", "having" and "including" have equivalent meanings.

As used herein, the term "and/or" can include any and all combinations of one or more of the associated listed elements or features.

It will be understood that when an element or feature is referred to as being "on", "attached" to, "connected" to, "coupled" with, "contacting", etc. another element or feature, that element or feature can be directly on, attached to, connected to, coupled with or contacting the other element or feature or intervening elements may also be present. In contrast, when an element or feature is referred to as being, for example, "directly on", "directly attached" to, "directly connected" to, "directly coupled" with or "directly contacting" another element of feature, there are no intervening elements or features present.

It will be understood that spatially relative terms, such as "under", "below", "lower", "over", "above", "upper", "front", "back" and the like, may be used herein for ease of describing the relationship of an element or feature to another element or feature as depicted in the figures. The spatially relative terms can however, encompass different orientations in use or operation in addition to the orientation depicted in the figures.

Reference herein to "example" means that one or more feature, structure, element, component, characteristic and/or operational step described in connection with the example is included in at least one embodiment and or implementation of the subject matter according to the present disclosure. Thus, the phrases "an example," "another example," and similar language throughout the present disclosure may, but do not necessarily, refer to the same example. Further, the subject matter characterizing any one example may, but does not necessarily, include the subject matter characterizing any other example.

Reference herein to "configured" denotes an actual state of configuration that fundamentally ties the element or feature to the physical characteristics of the element or feature preceding the phrase "configured to".

Unless otherwise indicated, the terms "first," "second," etc. are used herein merely as labels, and are not intended to impose ordinal, positional, or hierarchical requirements on the items to which these terms refer. Moreover, reference to a "second" item does not require or preclude the existence of lower-numbered item (e.g., a "first" item) and/or a higher-numbered item (e.g., a "third" item).

As used herein, the terms "approximately" and "about" represent an amount close to the stated amount that still performs the desired function or achieves the desired result. For example, the terms "approximately" and "about" may refer to an amount that is within less than 10% of, within less than 5% of, within less than 1% of, within less than 0.1% of, or within less than 0.01% of the stated amount.

Some of the following examples have been described specifically in relation to well infrastructure relating to oil and gas production, or the like, but of course the systems and methods may be used with other well structures. Similarly, while in the following example an offshore well structure is described, nevertheless the same systems and methods may be used onshore, as will be appreciated.

Turning now to FIG. 1, a simplified representation of a section of a well 100 is shown. In this embodiment, the well 100 is an offshore well. A well structure 102 extends from the surface to a subterranean formation. In this embodiment, the surface is the seabed or mudline 104. The well structure 102 may comprise a conductor, casing and other tubing used to recover product from the subterranean formation. The well 100 further comprises a wellhead 106, wet tree or the like, at a production platform 108. In other embodiments, the wellhead 106 is located at the mudline 104.

As a person skilled in the art will appreciate, the well 100 may further comprise an open hole section, in that there is no well structure positioned within the well 100 in the open hole section, or be terminated as shown in FIG. 1. The open hole structure may be lower than the well structure. The open hole structure may be located above the well structure 102. Similarly, a person skilled in the art will appreciate that the well 100 may be any one of a production well, injection well, appraisal well or a side track of an existing well.

Figure 2:
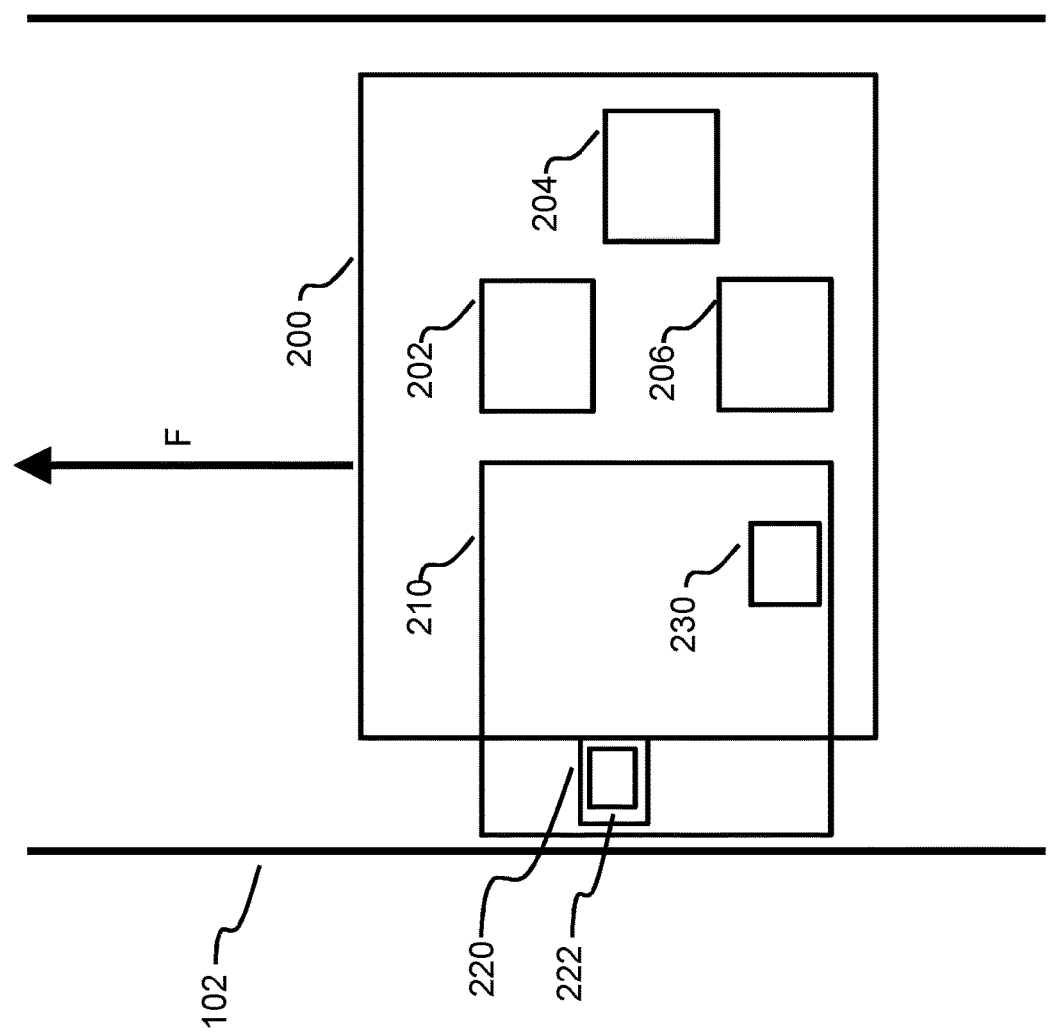
FIG. 2 is a simplified block diagram of a downhole tool in the well structure of FIG. 1.

Turning now to FIG. 2, a downhole tool 200 is shown in the well structure 102 of the well 100. The downhole tool 200 is positioned in the well structure 102. The downhole tool 200 is positioned in the well structure 102 by one or more of hangers, clamps, friction fit, setting tools, etc. As shown in FIG. 2, fluid flows in direction F within the well structure 102. In this embodiment, the fluid is downhole fluid. Specifically, the downhole fluid is production fluid.

The downhole tool 200 is configured to monitor the status of the well during one or more of well drilling, completion and production. In this embodiment, the downhole tool 200 comprises a sensor 202, communication module 204 and battery 206. As a person skilled in the art will appreciate, the downhole tool 200 may comprise multiple sensors 202, communication modules 204 and batteries 206.

The sensor 202 is configured to detect at least one of force, temperature, pressure, conductivity and resistivity or other relevant metric. The sensor 202 is communicatively connected to the communication module 204. In this embodiment, the communicative connection is wired. As a person skilled in the art will appreciate, the communicative connection may be wireless.

The communication module 204 is configured to transmit and/or receive communication signals. In this embodiment, the communication module 204 comprises a transceiver. The communication module 204 is configured to transmit data collected by the sensor 202 to a remote location. In this embodiment, the remote location is located at the surface of the well 100.

In this embodiment, the communication module 204 employs wired and/or wireless communication methods. Wired communication methods are through a guided transmission medium, such as a wire, other metallic structure or a material having high electromagnetic (EM) conductivity relative to a surrounding medium. Wired communication methods may utilize e-lines, slicklines, fiber optic cabling, etc. Wireless communication methods are not through a guided transmission medium. Wireless communication methods are through air, water, ground (or formation) or another medium that has substantially isotropic EM conductivity. In some or more examples, wireless communication methods utilize electromagnetic technology, acoustic technology and/or pressure wave technology.

The battery 206 is configured to power the sensor 202 and the communication module 204. In this embodiment, the battery 206 comprises a single battery cell; however, a person skilled in the art will appreciate that the battery 206 may comprise multiple battery cells connected in series or parallel.

While the downhole tool 200 has been described as comprising a battery 206, a person skilled in the art will appreciate that other configurations are possible. In another embodiment, the downhole tool 200 is configured to receive power transmitted downhole. Specifically, the downhole tool 200 receives power via wired connection (e.g. e-lines or slicklines) through the well structure 102. In another embodiment, the downhole tool 200 receives power via wireless connection (e.g. power transmitted through the formation surrounding the well structure 102 or through the well structure 102 itself).

Regardless of how the downhole tool 200 is powered (wired, wireless or battery, or some a combination thereof), powering the downhole tool 200 may be problematic.

In the case of a wired connection providing power, the connection provides a dedicated power source at some other location, e.g. the surface of the well 100. This is often not practical or cost efficient in off-shore wells. For example, in abandoned wells a dedicated power source is required to monitor the well 100 for extended periods. The source may require maintenance or replacement which increases abandonment costs. Furthermore, wired power connections may experience losses making downhole power supply inefficient and costly.

In wireless connections, a remote power source is also required which may suffer from the same issues previously described in regard to wired connections. Furthermore, power provisions may be limited by the wireless power technology used, composition of the formation surrounding the well 100 or severing of the well structure 102.

Battery power provides a power source within the downhole tool 200; however, the power capacity of the battery 206 is limited to the size of the downhole tool 200 and valuable space within the tool 200 is occupied by the battery 206 reducing the sensing and/or communication capabilities of the tool 200. Furthermore, spent batteries must be replaced or the downhole tool 200 must be entirely replaced limiting the useful life of the tool 200.

For these reasons, downhole power generation may be preferred. Downhole power generation provides a power source at the downhole location of the downhole tool 200 thereby limiting wireless or wired power losses. Furthermore, in contrast with the battery 206, downhole power generation is not limited to the size or number of batteries and does require replacement of spent batteries, or replacement of the entire downhole tool 200.

As shown in FIG. 2, the downhole tool 200 further comprises a downhole power generation device 210. The downhole power generation device 210 is configured to provide electrical power to the downhole tool 200 and/or to charge the battery 206.

The downhole power generation device 210 comprises a member 220. The device 210 also includes at least one magnetic element and an electrically conductive element, which in the examples described is a coil 230 of electrically conductive material. The member 220 is configured to be positioned within the fluid that flows in direction F. As will be appreciated, the coil 230 may comprise electrically conductive wire having a plurality of turns. The electrically conductive wire may comprise copper wire and/or a section of downhole tubing. However, it will be appreciated that this arrangement could be reversed. It is noted here that the term "element" as used herein encompasses a separate, discrete part or feature and also encompasses a portion of another part or feature. The term "element" also encompasses a plurality of separate parts or features and need not always be a single part or feature.

The overall size and shape of the member 220 is at least partially determined by the available space within the flow annulus of the well structure 102. In particular, the shape of the member 220 is optimized to create a turbulence within a portion of the flow, which can be exploited for power generation. In this embodiment, such design optimization is conducted using computational fluid dynamics, commensurate with the range of fluid properties and flow rates of fluid in the well structure 102.

The member 220 is cantilevered with respect to the downhole tool 200. That is, the member 220 is connected at a first (or proximal) end to a housing of the downhole tool 200 and projects outwardly towards a second (or distal) end therefrom. The member 220 is configured to flex within the fluid. In particular, the member 220 is configured to vibrate or flutter when exposed to the fluid flow. That is, the member 220 projects into the well structure 102 (or open hole) such that fluid flows past or over a surface of the member 220 due to the fluid flow F. The shape of the member 220 creates a turbulence in the fluid flow, depending on the Reynolds number of the flow. The turbulent flow imparts a fluctuating fluid pressure on the member 220, which results in flexure of the cantilever structure of the member 220, fluctuation in the magnetic coupling, and an induced electromotive force in the coil 230. Examples of such behavior include vortex shedding and the forced resonance experience by the Tacoma Narrows Bridge.

The member 220 is further configured such that the member 220 does not suffer fatigue under flow conditions.

The member 220 is configured to protrude into the downhole fluid in the well structure 102. However, in contrast with prior art turbines or oscillating pistons, the member 220 is configured to insignificantly impact or restrict the speed of fluid flowing in the well structure 102.

The member 220 is corrosion-resistant such that the member 220 does not generally corrode or fail when exposed to the downhole fluid. In this embodiment, at least part of the member 220 is manufactured of the same material as a housing of the downhole tool 200 and, in other arrangements, the same material as downhole tubing of the well structure 102.

The member 220 comprises a magnetic element 222. The magnetic element 222 may be positioned at or proximal to a distal end of the member 220, such that movement of the magnetic element 222 during vibration of the member 220 is of sufficient magnitude. Specifically, the magnetic element 222 is connected to and optionally embedded within the member 220. The magnetic element 222 may be embedded or encased in the member 220 such that it is not exposed to the downhole fluid. The magnetic element 222 and the member 220 are configured to generate a magnetic field that extends beyond an outer surface of the member 220. In this embodiment, the magnetic element 222 comprises at least one permanent magnet.

The coil 230 is positioned in the magnetic field of the magnetic element 222 of the member 220. In the exemplary arrangement of FIG. 2, the coil 230 may be considered to be a stator of an electrical generator. As will be appreciated, movement of the magnetic element 222, and therefore of the lines of flux of the magnetic field, induces an electromotive force in the electrically conductive material of the coil 230.

In the example of FIG. 2, the coil 230 is within a housing of the downhole tool 200. In some arrangements, if the coil 230 is close enough to the magnetic element, an open end of the coil may face the magnetic element 222 of the member 220. As mentioned above, the coil 230 is wound, electrically conductive wire.

As will be described, vibration of the member 220 comprising the magnetic element 222 causes a change in the magnetic field at the coil 230 such that an electromotive force is induced in the coil 230.

Figure 3:
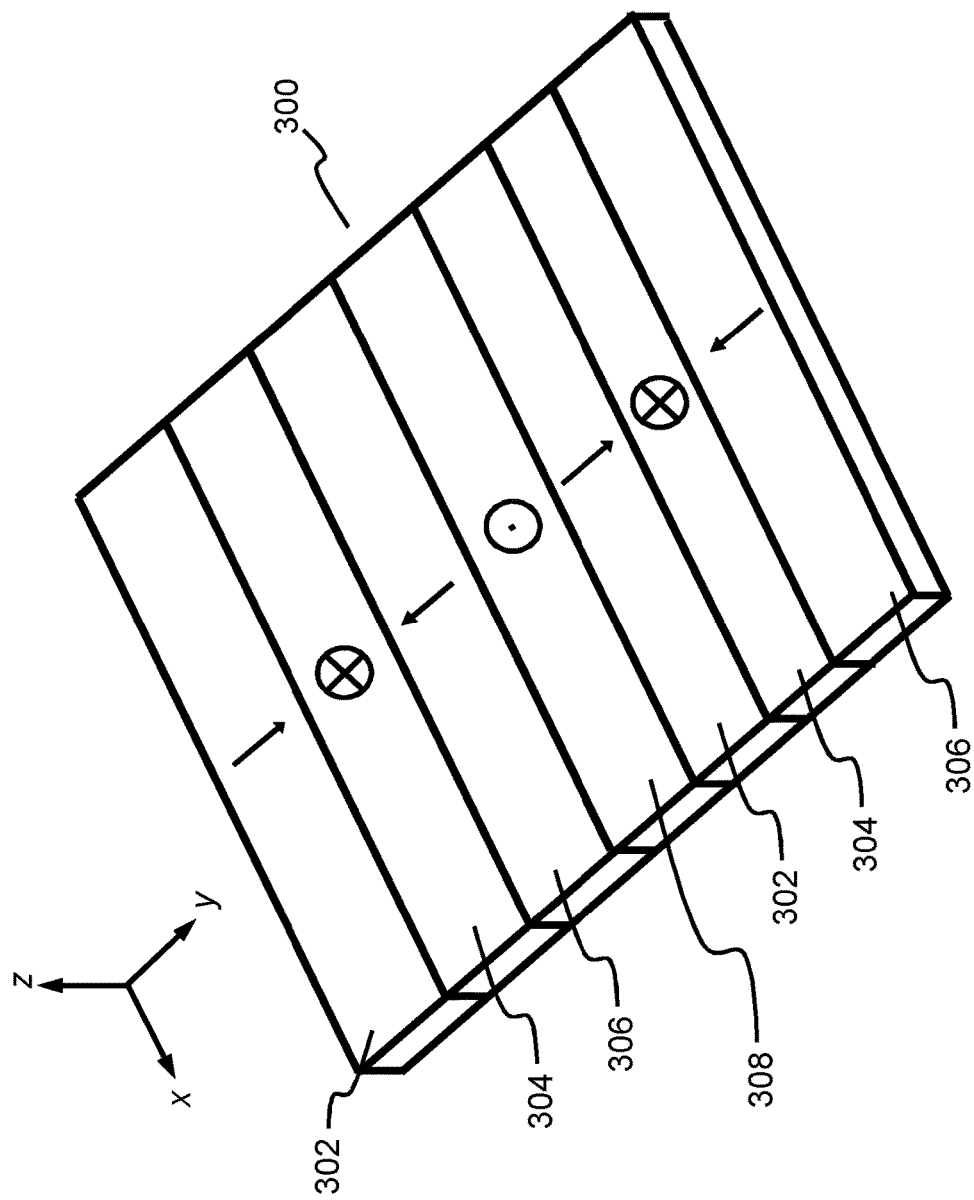
FIG. 3 is a perspective view of a linear Halbach array of a downhole power generation device.

In this embodiment, the magnetic element 222 comprises an array of a plurality of magnets. The array is arranged to augment the magnetic field such that it has a greater magnitude on one side of the array. One example of such an array, which is shown in FIG. 3, is a Halbach array 300. The array 300 is configured to augment the magnetic field generated by the magnet 222, such that a magnetic field on a first side of the array 300 has a magnitude greater than the magnetic field on a second, generally opposite, side of the array 300. In one specific arrangement, the array 300 is configured to augment the magnetic field to one side of the array 300 while suppressing the magnetic field on the other side of the array 300.

The Halbach array 300 comprises adjacent magnets 302, 304, 306, 306. That is, the magnets 302, 304, 306, 308 are aligned next to each other and in some arrangements are in direct contact. The orientation of each of the magnets 302, 304, 306, 308 is offset from the adjacent magnets. In the specific arrangement shown in FIG. 3, the adjacent magnets are rotated with respect to each other. The adjacent magnets have alternating magnetization in the y and z directions. In this embodiment, the magnets are permanent magnets.

Specifically, the adjacent magnets 302, 304, 306, 308 are main magnets and transit magnets. Each transmit magnet is adjacent two main magnets. In this embodiment, the Halbach array comprises 7 (seven) magnets.

Specifically, the Halbach array 300 comprises two (2) positive y magnets 302, two (2) negative z magnets 304, two (2) negative y magnets 306 and a single positive z magnet 308. The x, y and z directions are indicated in FIG. 3. The magnets 302, 304, 306, 308 are adjacent in the y direction.

Each positive y magnet 302 generates a magnetic flux in the positive y direction. Each negative z magnet 304 generates a magnetic flux in the negative z direction. Each negative y magnet 306 generates a magnetic flux in the negative y direction. The positive z magnet 308 generates a magnetic flux in the positive y direction.

One positive y magnet 302 is adjacent one negative z magnet 304 and the positive z magnet 308, and the other positive y magnet 302 is adjacent the other negative z magnet 304. Each negative z magnet 304 is adjacent one positive y magnet 302 and one negative y magnet 306. One negative y magnet 306 is adjacent one negative z magnet 304 and the positive z magnet 308, and the other negative y magnet 306 is adjacent the other negative z magnet 304. The positive z magnet 308 is adjacent one negative y magnet 306 and one positive y magnet 302.

The particular configuration and orientation of the magnets 302, 304, 306 and 308 concentrates the magnetic field on one side of the array 300 while suppressing the magnetic field on the other side of the array 300. In this embodiment, the magnetic field is concentrated in the negative z direction (i.e. the underside of the array 300 shown in FIG. 3).

While a particular the Halbach array 300 has been described as having a particular configuration, a person skilled in the art will appreciate that other configurations are possible. For example, the array 300 may comprises more or fewer magnets, the magnets may be non-permanent magnets and the magnetic flux orientations of the magnets may be different. In another embodiment, the Halbach array 300 has a planar configuration of radially-aligned and axially-aligned permanent magnets in circular format, such that the magnetic field is axially concentrated on one side of the array and suppressed on the opposite side.

During operation, the downhole tool 200 is positioned in the well structure 102 where fluid is flowing in the direction F shown in FIG. 2. As previously stated, the downhole tool 200 is secured to the well structure 102 using known means. As previously stated, the downhole tool 200 comprises the downhole power generation device 210 which is similarly positioned in the structure 102. The member 220 of the downhole power generation device 210 is exposed to fluid flow in the well structure 102. Specifically, the member 220 is exposed to production fluid flow in the direction F. As the member 220 is made of corrosive resistant material similar to the downhole tool 200, the member 220 does not corrode or fail as a result of being exposed to production fluid flow. Furthermore, the member 220 minimizes restriction of fluid flow of the production flow.

The member 220 does not have any moving parts that are liable to fail when exposed to the production fluid flow. Thus, the member 220 is more robust than conventional downhole power generation apparatus such as turbines or oscillating pistons.

The member 220 vibrates as a result of the exposure to turbulent fluid flow. The magnet 222 embedded in the member 220 similarly vibrates and generates a fluctuating magnetic field. The coil 230 of the downhole power generation device 210 is exposed to the magnetic field generated by the magnet 222. The coil 230 is positioned to face the magnet 220 to maximize the magnetic coupling. Furthermore, the magnet 220 is a Halbach array that concentrates the magnetic field that the coil 230 is exposed to. The changing magnetic field due to the vibrating magnet 222 and member 230 induces an electromotive force in the coil 230. The induced electromotive force is used to provide electrical power to one or more components of the downhole tool 200. Specifically, the electrical power resulting from the electromotive force is used to the power one or more of the sensor 202 and the communication module 204. Alternatively or additionally, the electrical power resulting from the electromotive force charges the battery 206 of the downhole tool 200.

In this manner, the downhole power generation device 220 generates power for the downhole tool 200. Thus, the downhole tool 200 can provide power to any elements contained therein such as the sensor 202 and communication module 204. Furthermore, the battery 206 of the downhole tool 200 may be charged by the downhole power generation device 220. The downhole tool 200 may accordingly house none or fewer batteries 206 allowing for more room for sensors 202, communication modules 204 or other equipment.

Figure 4:
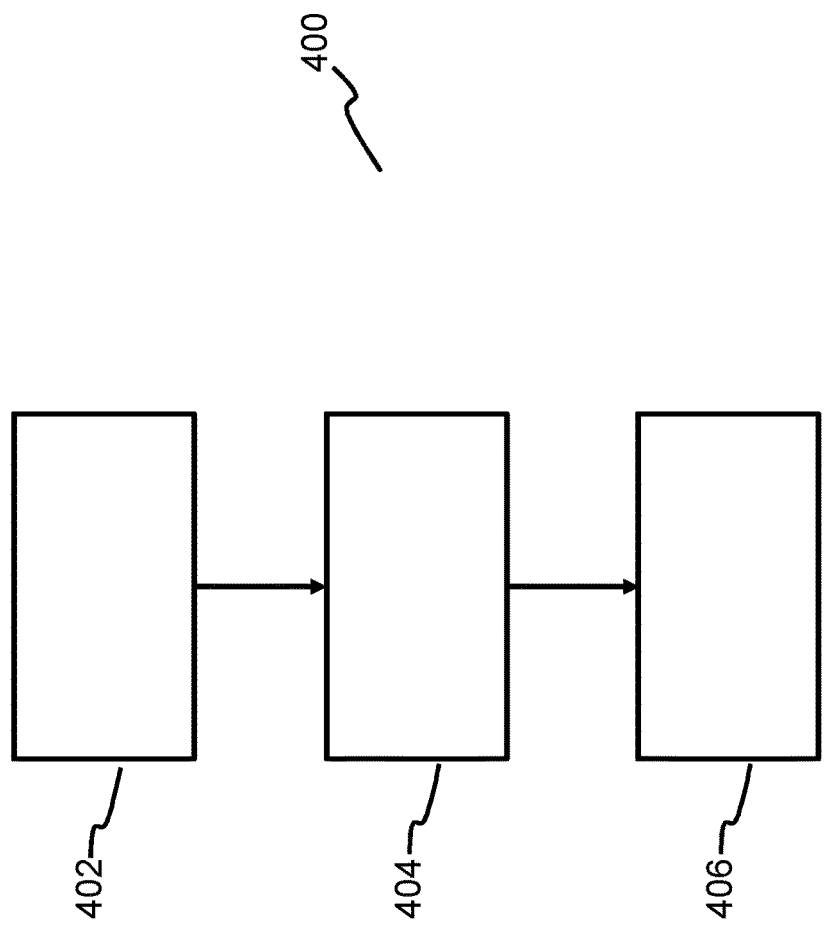
FIG. 4 is a flowchart of a method of generating power downhole.

The described operation of the downhole power generation device 210 is shown in the flowchart of FIG. 4 generally identified as reference numeral 400. The method 400 comprises exposing 402 the member 220 having a magnet 222 to downhole fluid flow; vibrating 404 the member 220 via the downhole turbulent fluid flow; and generating 406 a current in the coil 230 via the vibrating magnetic field generated by the magnet 222.

Figure 5:
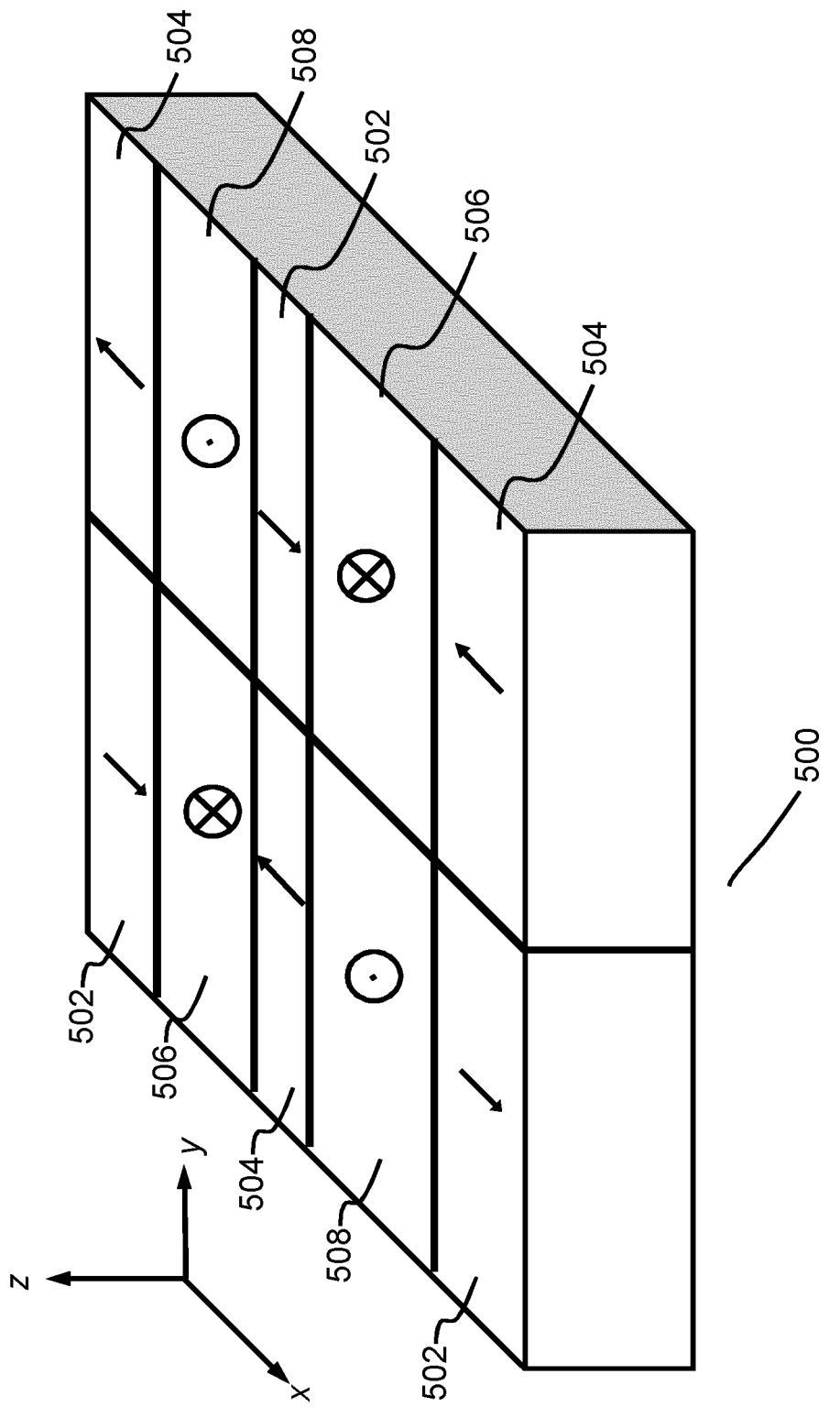
FIG. 5 is a simplified representation of a two-dimensional Halbach array of a downhole power generation device.

While a particular Halbach array 300 has been shown, a person skilled in the art will appreciate that other configurations are possible. Turning now to FIG. 5, another embodiment of a Halbach array is shown. In this embodiment, the Halbach array is a double Halbach array 500. Similar to the previously described Halbach array 300, the double Halbach array 500 is configured to augment the magnet field generated by the magnet 222 to one side of the array 500 while suppressing the magnetic field on the other side of the array 500.

In this embodiment, the double Halbach array 500 comprises three positive x magnets 502, three negative x magnets 504, two negative z magnets 506, and two positive z magnets 508. The x, y and z directions are indicated in FIG. 5. The magnets 502, 504, 506 and 508 are adjacent in the x and y directions as will be described.

Each positive x magnet 502 generates a magnetic flux in the positive x direction. Each negative x magnet 504 generates a magnetic flux in the negative x direction. Each negative z magnet 506 generates a magnetic flux in the negative z direction. Each positive z magnet 508 generates a magnetic flux in the positive z direction.

One positive x magnet 502 is adjacent one negative x magnet 504 in the y direction and one negative z magnet 506 in the x direction. Another positive x magnet 502 is adjacent another negative x magnet 504 in the y direction, and one negative z magnet 506 and one positive z magnet 508 in the x direction. Another positive x magnet 502 is adjacent another negative x magnet 504 in the y direction and one positive z magnet 508 in the x direction.

One negative x magnet 504 is adjacent one positive x magnet 502 in the y direction and one positive z magnet 508 in the x direction. Another negative x magnet 504 is adjacent one positive x magnet 502 in the y direction, and one negative z magnet 506 and one positive z magnet 508 in the x direction. Another negative x magnet 504 is adjacent one positive x magnet 502 in the y direction and one negative z magnet 506 in the x direction.

Both negative z magnets 506 are each adjacent one positive z magnet 508 in the y direction, and one positive x magnet 502 and one negative x magnet 504 in the x direction.

Both positive z magnets 508 are each adjacent one negative z magnet 506 in the y direction, and one positive x magnet 502 and one negative x magnet 504 in the x direction.

The particular configuration and orientation of the magnets 504, 504, 506 and 508 concentrates the magnetic field on one side of the array 500 while reducing the magnetic field levels on the other side of the array 500. In this embodiment, the magnetic field is concentrated in the negative z direction (i.e. the underside of the array 500 shown in FIG. 5).

While the downhole tool 200 has been described as comprising the downhole power generation device 210, a person skilled in the art will appreciate that other configurations are possible. In another embodiment the downhole power generation device 210 is separate and distinct from the downhole tool 200. In this embodiment, the downhole tool 200 comprises the coil 230. The downhole power generation device 210 induces an electromotive force in the coil 230 in the manner previously described. In another embodiment, the downhole power generation device 210 comprise the coil 230. The electrical power resulting from the electromotive force induced in the coil 230 is transferred via wired or wireless connection to the downhole tool 200.

The applicant discloses in isolation each individual feature described herein and any combination of two or more such features, to the extent that such features or combinations are capable of being carried out based on the specification as a whole in the light of the common general knowledge of a person skilled in the art, irrespective of whether such features or combinations of features solve any problems disclosed herein, and without limitation to the scope of the claims. The applicant indicates that aspects of the invention may consist of any such individual feature or combination of features. In view of the foregoing description it will be evident to a person skilled in the art that various modifications may be made within the scope of the invention.

The invention claimed is:
1. A downhole tool for use within a well structure configured to contain a fluid flow, comprising:
   a housing configured to be disposed within the well structure and to form an annulus with the well structure when disposed within the well structure to permit passage of the fluid flow between the housing and the well structure;
   an electrical power generation device that includes:
      an electrically conductive element disposed within the housing; and
      a member that extends outwardly from the housing, from a member first end that is connected to the housing to a member distal end in a cantilever configuration, and the member is configured to vibrate when subjected to the fluid flow within the annulus between the housing and the well structure; and
      at least one magnetic element attached to the member, the at least one magnetic member configured to produce a magnetic field;
   wherein the electrically conductive element is positioned within the housing in proximity to the at least one magnetic element such that the electrically conductive element is exposed to the magnetic field produced by the at least one magnetic element, and the electrically conductive member is configured to generate electrical power on vibration of the member.

2. The downhole tool of claim 1, wherein the at least one magnetic element comprises an array of magnets.

3. The downhole tool of claim 2, wherein at least two adjacent magnets of the array of magnets are rotated with respect to each other.

4. The downhole tool of claim 2, wherein the array of magnets forms a Halbach array.

5. The downhole tool of claim 2, wherein the array of magnets is configured to augment the magnetic field such that a magnitude of the magnetic field on a first side of the array is greater than a magnitude of the magnetic field on a second, substantially opposed side of the array.

6. The downhole tool of claim 5, wherein the magnetic field on the second side of the array is suppressed.

7. The downhole tool of claim 1, wherein the at least one magnetic element and the electrically conductive element is positioned at or proximal to a distal end of the member.

8. The downhole tool of claim 1, wherein the at least one magnetic element and the electrically conductive element is embedded and/or encased within the member.

9. The downhole tool of claim 1, wherein the housing is configured to maintain the electrically conductive element from exposure to the fluid flow.

10. The downhole tool of claim 1, wherein the member has a stiffness permitting bending of the member under a force resulting from turbulence in the fluid flow within the annulus between the housing and the well structure.

11. The downhole tool of claim 10, wherein the member is shaped to increase and/or generate the force in a particular direction.

12. The downhole tool of claim 1, wherein the electrically conductive element comprises a coil of electrically conductive wire.

13. The downhole tool of claim 1, wherein the member is made of a corrosion-resistant material.

14. The downhole tool of claim 1, wherein the member comprises the same material as the housing.

15. The downhole tool of claim 1, wherein the downhole tool comprises a component disposed within the housing, and the downhole tool is configured to provide the electrical power generated by the electrically conductive member to the component.

16. The downhole tool of claim 15, wherein the component is a battery disposed within the housing.

17. A method of generating electrical power within a well structure configured to contain a fluid flow, comprising:
providing a downhole tool having a housing configured to be disposed within the well structure, and an electrical power generation device that includes:
an electrically conductive element disposed within the housing; and
a member that extends outwardly from the housing, from a member first end that is connected to the housing to a member distal end in a cantilever configuration; and
at least one magnetic element attached to the member, the at least one magnetic member configured to produce a magnetic field;
wherein the electrically conductive element is positioned within the housing in proximity to the at least one magnetic element such that the electrically conductive element is exposed to the magnetic field produced by the at least one magnetic element; and
disposing the downhole tool within the well structure such that an annulus is formed between the well structure and the housing that permits passage of the fluid flow between the housing and the well structure, and the member is disposed in the annulus where it is exposed to the fluid flow in a manner that allows the member to vibrate as a result of the exposure to the fluid flow within the annulus, wherein the vibration of the member causes the electrically conductive member to generate electrical power.

18. The method of claim 17, further comprising powering one or more components of a downhole tool and/or charging a battery of the downhole tool with the generated electrical power.

\* \* \* \* \*